United States Patent [19]

Schmidt

[11] Patent Number: 4,834,140

[45] Date of Patent: May 30, 1989

[54] BRAKE BLEEDER VALVE

[76] Inventor: Richard A. Schmidt, 9625 SW. 130th, Beaverton, Oreg. 97005

[21] Appl. No.: 280,425

[22] Filed: Dec. 6, 1988

[51] Int. Cl.$^4$ .................. F16K 31/50; F16K 27/08
[52] U.S. Cl. .................. 137/614.17; 137/381; 188/352; 222/545; 222/562; 251/216; 251/218; 251/351
[58] Field of Search ............ 137/381, 382, 539, 543.17, 137/599.2, 614.16, 614.17, 614.18; 188/352; 222/545, 546, 562; 251/215, 216, 217, 218, 351, 352

[56] References Cited

U.S. PATENT DOCUMENTS

| | | | |
|---|---|---|---|
| 2,619,914 | 12/1952 | Dobkin | 137/614.16 |
| 2,763,285 | 9/1956 | Reeves | 137/614.17 |
| 2,771,093 | 11/1956 | Wilson | 137/614.17 |
| 2,892,614 | 6/1959 | Majneri | 188/352 |
| 3,042,071 | 7/1962 | Van Tuyl | 137/614.17 |
| 3,050,080 | 8/1962 | Pagano | 137/614.17 |
| 3,578,285 | 5/1971 | Carlton | 251/218 |
| 3,913,619 | 10/1975 | Aulner et al. | 188/352 |
| 4,164,241 | 8/1979 | Kubo | 188/352 |
| 4,307,748 | 12/1981 | Mathias | 251/351 |
| 4,318,460 | 3/1982 | Kosinski | 188/352 |
| 4,445,530 | 5/1984 | Meixell | 251/351 |
| 4,470,577 | 9/1984 | Warwick | 251/216 |
| 4,474,272 | 10/1984 | Omlie | 188/352 |
| 4,664,451 | 3/1987 | Sakaguchi et al. | 188/352 |

Primary Examiner—George L. Walton
Attorney, Agent, or Firm—Jerry T. Kearns

[57] ABSTRACT

A brake bleeder valve includes a spring biased ball check valve which allows bleeding of brake wheel cylinders by a single individual. The brake bleeder valve has an elongated generally cylindrical body terminating at a lower end in a conical tip dimensioned for engagement in a complementary formed valve seat in a brake wheel cylinder. An intermediate portion of the body has external threads for engagement with complementary formed threads in a brake wheel cylinder. An upper end of the body terminates in a frusto conical hose fitting and an enlarged hexagonal wrench flat portion is formed between the hose fitting and the intermediate threads. An enlarged diameter spherical seat is formed within the hose fitting and movably receives a spherical spring urged check ball. An O-ring around the body portion prevents air leakage past the threads. The central bore has a laterally extending outlet adjacent the conical tip portion. In use, the bleeder valve is loosened slightly to disengage the conical tip from the wheel cylinder valve seat and the brake pedal is repeatedly depressed and released. The check valve allows air and fluid to be exhausted upon each depression of the pedal, but prevents air from being inducted upon release of the brake pedal. A novel dust cap is disclosed for frictional engagement over the bleeder valve hose fitting.

4 Claims, 2 Drawing Sheets

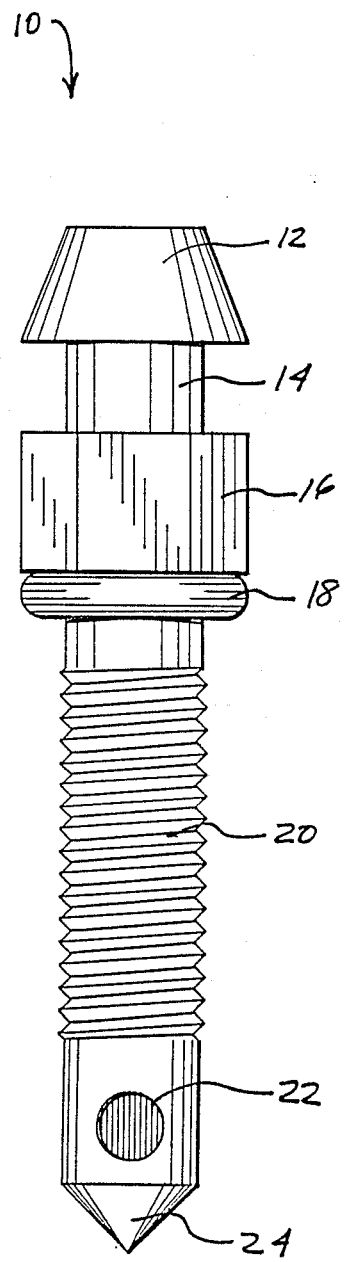
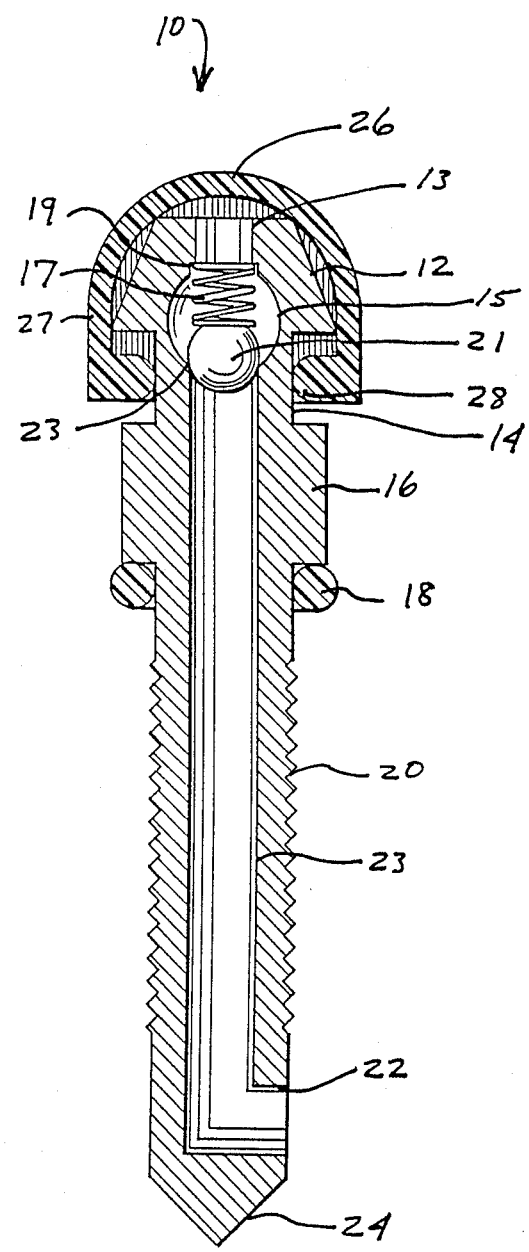
Fig. 1
Fig. 2

BRAKE BLEEDER VALVE

BACKGROUND OF THE INVENTION

1. Field of the Invention

The present invention relates to brake bleeder valves, and more particularly pertains to a new and improved brake bleeder valve which includes a ball check valve to enable bleeding of brakes by a single individual. Hydraulic systems on brake vehicles typically include a master cylinder mounted beneath the hood of the vehicle and a wheel cylinder formed in the brake caliper at each wheel of the vehicle. Upon depressing the brake pedal, the master cylinder transmits fluid pressure to the wheel cylinder, which moves a piston received therein to apply the vehicle brakes. Upon servicing such hydraulic brakes, air frequently becomes trapped in the brake lines and in the wheel cylinders. In order to enable trapped air to be expelled, a brake bleeder valve is typically provided at each wheel cylinder Conventionally, the bleeding of air from such hydraulic brake systems has been a two man operation. A first individual repeatedly depresses and releases the brake pedal and a second individual tightens and loosens the brake bleeder valve at the wheel cylinder as the brake pedal is depressed and released. When the brake pedal is being depressed, it is necessary to release the brake bleeder valve, to allow the trapped air to be exhausted. Before release of the brake pedal, the bleeder valve must be tightened, to prevent air from being drawn into the wheel cylinder, as the piston is retracted. This tedious and time consuming procedure must be repeated at each wheel cylinder in order to complete the process. In order to allow a brake bleeding process by a single individual, the present invention provides a new and improved brake bleeder valve which utilizes a check valve to prevent air from being inducted into the wheel cylinder when the brake pedal is released.

2. Description of the Prior Art

Various types of brake bleeder valves are known in the prior art. A typical example of such a brake bleeder valve is to be found in U.S. Pat. No. 3,913,619, which issued to M. Aulner et al on Oct. 21, 1975. This patent discloses an air bleeder valve assembly for hydraulic systems, mountable in the bleeder outlet and containing a check valve, the spring of which is held in place by a spring retainer exerting a constant pressure against the walls of an air bleeder passage through a roll pin. U.S. Pat. No. 4,318,460, which issued to A. Kosinski on Mar. 9, 1982, discloses a fluid operated brake including a pressurized fluid chamber with a single supply and bleed fitting. The pressurized fluid chamber can be a wheel cylinder of a drum brake or a caliper housing of a disc brake. The chamber has a single port therein in which a fitting is mounted, the fitting being designed to supply fluid under pressure to the chamber and to bleed gas, commonly air from the chamber. With only a single opening for the chamber, one boss can be eliminated to save weight, and machining of that boss is also eliminated to save costs U.S. Pat. No. 4,474,272, which issued to D. Omlie on Oct. 2, 1984, discloses a wheel cylinder bleed passage incorporated in the brake fluid connector mounting bolt and including a ball check valve assembly for bleeding purposes. U.S. Pat. No. 4,664,451, which issued to S. Sakaguchi et al on May 12, 1987, discloses an air bleeder for a fluid braking system which operates to reduce a braking liquid pressure supplied to a wheel cylinder at a given proportion to a braking liquid pressure supplied to a front wheel cylinder as a braking liquid pressure is supplied from a master cylinder. An air bleeder is disclosed for use with such a fluid system, and includes a plunger slidably received in a bore formed in a housing in which a plate is fitted to serve as a stop member and an end of the plunger is maintained in abutment against the plate when operative. The air bleeder comprises an air bleeding path formed in a plate so as to extend across the area of contact between the plate and the plunger to maintain the space in communication with the fluid passage.

While the above mentioned devices are suited for their intended usage, none of these devices disclose a brake bleeder valve including an enlarged diameter spherical seat formed in a hose fitting at an upper end of the body of the valve, and having a spring urged ball check valve received therein to allow fluid flow through a central passage of the valve in only one direction. Additionally, none of the aforesaid devices disclose the provision of an O-ring received around the body of a bleeder valve and having an upper surface in contact with an abutment face formed on a lower end of a hexagonal wrench flat portion. Additional features of the present invention, not disclosed by the aforementioned prior art devices, include the provision of a tubular insert to form an annular abutment face for the check valve spring and the provision of a dust cap having a hemispherical top portion terminating in a cylindrical portion forming a radially inwardly extending annular flange defining a bottom end opening dimensioned for frictional engagement over the hose fitting at the upper end of the bleeder valve. Inasmuch as the art is relatively crowded with respect to these various types of brake bleeder valves, it can be appreciated that there is a continuing need for and interest in improvements to such brake bleeder valves, and in this respect, the present invention addresses this need and interest.

SUMMARY OF THE INVENTION

In view of the foregoing disadvantages inherent in the known types of brake bleeder valves now present in the prior art, the present invention provides an improved brake bleeder valve. As such, the general purpose of the present invention, which will be described subsequently in greater detail, is to provide a new and improved brake bleeder valve which has all the advantages of the prior art brake bleeder valves and none of the disadvantages.

To attain this, representative embodiments of the concepts of the present invention are illustrated in the drawings and make use of a spring biased ball check valve which allows bleeding of brake wheel cylinders by a single individual. The brake bleeder valve has an elongated generally cylindrical body terminating at a lower end in a conical tip dimensioned for engagement in a complementary formed valve seat in a brake wheel cylinder An intermediate portion of the body has external threads for engagement with complementary formed threads in a brake wheel cylinder. An upper end of the body terminates in a frusto conical hose fitting and an enlarged diameter hexagonal wrench engagement flat portion is formed between the hose fitting and the intermediate threads. An enlarged diameter spherical seat is formed within the hose fitting and movably receives a spherical spring urged check ball. An O-ring received around the body portion prevents air leakage pass the threads. The central bore has a laterally extending outlet adjacent the conical tip portion. In use, the bleeder valve is loosened slightly to disengage the conical tip from the wheel cylinder valve seat and the brake pedal is repeatedly depressed and released. The ball check valve allows air and fluid to be exhausted upon each depression of the pedal, but prevents air from being inducted upon release of the brake pedal. A novel dust cap is disclosed for frictional engagement over the bleeder valve hose fitting.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved brake bleeder valve which has all the advantages of the prior art brake bleeder valves and none of the disadvantages.

It is another object of the present invention to provide a new and improved brake bleeder valve which may be easily and efficiently manufactured and marketed.

It is a further object of the present invention to provide a new and improved brake bleeder valve which is of a durable and reliable construction.

An even further object of the present invention is to provide a new and improved brake bleeder valve which is susceptible of a low cost of manufacture with regard to both materials and labor, and which accordingly is then susceptible of low prices of sale to the consuming public, thereby making such brake bleeder valves economically available to the buying public Still yet another object of the present invention is to provide a new and improved brake bleeder valve which provides in the apparatuses and methods of the prior art some of the advantages thereof, while simultaneously overcoming some of the disadvantages normally associated therewith.

Still another object of the present invention is to provide a new and improved brake bleeder valve which utilizes a ball check valve to allow bleeding of hydraulic brake systems by a single individual.

Yet another object of the present invention is to provide a new an improved brake bleeder valve which includes a spherical enlarged diameter seat formed in a hose fitting at an upper end of a bleeder valve body portion.

Even still another object of the present invention is to provide a new and improved brake bleeder valve which includes a hexagonal wrench flat portion forming an abutment face for engagement with an O-ring to prevent air leakage through an intermediate threaded portion.

An additional object of the present invention is to provide a new and improved brake bleeder valve including a dust cap having a hemispherical top portion and a cylindrical side wall terminating in a radially extending annular flange defining a central opening dimensioned for frictional engagement over a hose fitting at the upper end of the bleeder valve body.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of the brake bleeder valve according to the first embodiment of the present invention.

FIG. 2 is a longitudinal cross sectional view, illustrating the construction of the bleeder valve and illustrating a novel form of dust cap according to the present invention.

DESCRIPTION OF THE PREFERRED EMBODIMENT

Figure 3:
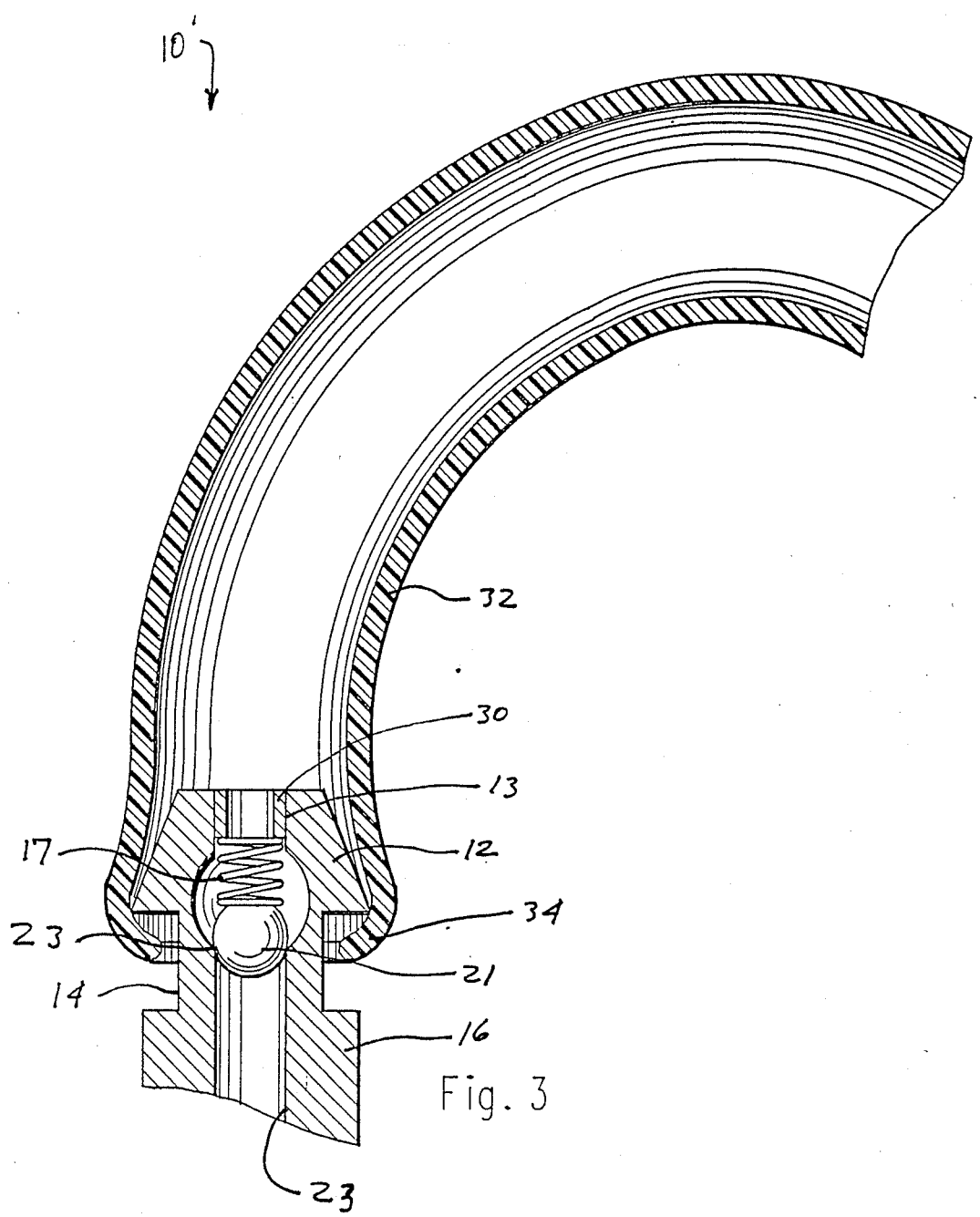
FIG. 3 illustrates a longitudinal cross sectional view of a slightly modified form of brake bleeder valve according to the present invention, which includes a tubular inserted member press fit into the hose fitting at the upper end of the valve body, forming an annular abutment surface for a check ball spring.

With reference now to the drawings, and in particular to FIG. 1 thereof, a new and improved brake bleeder valve embodying the principles and concepts of the present invention and generally designated by the reference numeral 10 will be described.

More specifically, it will be noted that the first embodiment 10 of the invention includes an elongated generally cylindrical body portion having an upper end terminating in a frusto conical hose fitting 12. A reduced diameter neck portion 14 extends between the hose fitting 12 and an enlarged diameter hexagonal wrench flat portion 16. The bottom surface of the wrench flat portion 16 forms an abutment face which engages a top surface of an O-ring 18 received around the cylindrical body portion. An intermediate portion of the cylindrical body is provided with external threads 20, dimensioned for engagement with complementary threads formed in the wheel cylinder of a hydraulic brake system. A lower end of the elongated body terminates in an conical tip 24, dimensioned for engagement with a complementary formed valve seat formed in a brake wheel cylinder. A lateral transverse cylindrical outlet passage 22 extends through a side wall of the elongated body portion, adjacent the conical tip 24.

As shown in FIG. 2, an elongated cylindrical passage 23 extends centrally through the brake bleeder valve body and intersects the transverse outlet passage 22, adjacent the conical tip 24. An enlarged diameter spherical seat 15 is formed in the upper end of the bleeder valve body portion, within the hose fitting 12. An annular shoulder 19 is formed around the cylindrical bore 23, and forms a seat for an upper end of a coil spring 17. An opposite end of the spring 17 is in engagement with a spherical ball check valve 21, which is illustrated in an closed position, in engagement with the intersection of the upper end of the cylindrical bore 23 with the spherical seat 15. The cylindrical central bore 23 extends upwardly through the hose fitting 12 through a cylindrical opening 13. A dust cap is frictionally engaged over the hose fitting 12 and has a hemispherical top portion 26 which intersects a cylindrical portion 27 having a radially inwardly extending annular flange 28 which forms a bottom circular opening dimensioned for frictional engagement with the neck portion 14 of the valve body. The dust cap is formed from a resilient material and has sufficient flexibility to be manually inserted over the hose fitting 12. In use, the brake bleeder valve 10 is utilized to replace the conventionally formed brake bleeder valve within a brake wheel cylinder. When it is desired to bleed air from the brake system, a wrench is utilized to slightly loosen the brake body by engagement with the wrench flat 16. This slight loosening of the valve body moves the conical tip portion 24 out of engagement with the complementary formed valve seat within the brake wheel cylinder, and provides a fluid connection through the passages 22, 23 and 13 with the brake wheel cylinder. The dust cap 26 is then removed and the brake pedal is pumped. As the brake pedal is depressed, trapped air and a small quantity of brake fluid is urged upwardly out the passage 23 and forces the ball 21 upwardly, against the bias spring 17. The trapped air and a small quantity of brake fluid are then exhausted through the outlet passage 13 formed through the top of the hose fitting 12. When the brake pedal is released, the spring 17 forces the ball 21 to the illustrated closed position, preventing the induction of air into the brake wheel cylinder. The brake pedal is merely repeatedly pumped, until all the air has been exhausted from the system. At this point, the brake bleeder valve 10 is retightened by engagement of a wrench with the flat portion 16. As the brake bleeder valve is tightened, the O-ring is depressed, which prevents any air or fluid leakage pass the threads 20.

In FIG. 3, a slightly modified form of brake bleeder valve according to the present invention is illustrated. The modified form of brake bleeder valve 10' is identically formed as the first embodiment 10, with the exception that a cylindrical tubular insert 30 is pressed fit within the outlet passage 13 formed through the hose fitting 12. The press fit tubular insert forms an annular abutment face for the upper end of the spring 17. It should be noted that the insert 30, instead of being press fit may be formed with a threaded connection within the passage 13 in engagement with complementary threads formed within the hose fitting 12. Through the engagement of a flexible tube 32 having a first end 34 frictionally engaged with the hose fitting 12 and an opposite end inserted within a suitable receptacle (not shown), the brake fluid expelled during the brake bleeding process may be collected.

As may now be understood, the brake bleeder valve of the present invention may be inexpensively substituted for the conventional brake bleeder valve provided as original equipment on each brake wheel cylinder of a vehicle. Upon subsequent brake servicing operations, the trapped air may be expelled from the hydraulic brake system by only a single individual, thus saving considerable time and attendant expense.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A brake bleeder valve for use in a hydraulic brake wheel cylinder, comprising:
   an elongated generally cylindrical body;
   said body terminating at a lower end in a conical tip dimensioned for engagement in a complementary formed valve seat in a brake wheel cylinder;
   an intermediate portion of said body having external threads for engagement with complementary formed threads in a brake wheel cylinder;
   an upper end of said body terminating in a frusto conical hose fitting;
   an enlarged diameter wrench engagement flat portion formed on said body, between said hose fitting and said intermediate threaded portion, a lower face of said wrench flat portion forming an abutment face;
   an O-ring received around said body between said intermediate threaded portion and said wrench flat portion, said O-ring having an upper surface in contact with said abutment face;
   an elongated cylindrical bore extending from said hose fitting, centrally through said body portion and terminating slightly above said conical tip;
   a transverse cylindrical bore extending through a side wall of said body and intersecting said elongated cylindrical central bore adjacent said conical tip;

an enlarged diameter spherical cavity with a seat formed in said hose fitting and interconnecting said elongated cylindrical bore at said hose fitting;

an annular shoulder formed in the upper end of said spherical cavity and coaxial with said elongated cylindrical bore;

a spherical check ball movably received in said spherical cavity, said check ball being substantially less in diameter that said spherical cavity to prevent any fluid contaminants from collecting in said elongated cylindrical bore while allowing the contaminants to flow around said check ball into said cavity for easy removal from said hose fitting; and a coil spring having one end in abutment with said check ball and an opposite end in abutment with said annular shoulder.

2. The brake bleeder valve of claim 1, further comprising a removable dust cap on said hose fitting, said dust cap having a hollow body terminating in a hemispherical top portion;

a cylindrical portion intersecting said hemispherical top portion; and said cylindrical portion terminating in a radially inwardly extending annular flange defining a bottom end opening dimensioned for frictional engagement over said hose fitting.

3. The brake bleeder valve of claim 1, wherein said annular shoulder formed around said cylindrical bore in said upper end of said body is formed by a cylindrical tubular insert received in said central bore within said hose fitting.

4. The brake bleeder valve of claim 3, wherein said insert is pressed fit within said central bore.

* * * * *